(12) United States Patent
    Pierce

(10) Patent No.: US 11,972,009 B2
(45) Date of Patent: Apr. 30, 2024

(54) SYSTEMS AND METHODS OF IDENTIFYING AND MANAGING REMOTELY PILOTED AND PILOTED AIR TRAFFIC

(71) Applicant: PIERCE AEROSPACE INCORPORATED, Fishers, IN (US)

(72) Inventor: Aaron Pierce, Carmel, IN (US)

(73) Assignee: Pierce Aerospace Incorporated, Fishers, IN (US)

( * ) Notice: Subject to any disclaimer, the term of this patent is extended or adjusted under 35 U.S.C. 154(b) by 287 days.

(21) Appl. No.: 17/278,651

(22) PCT Filed: Sep. 22, 2018

(86) PCT No.: PCT/US2018/052328
§ 371 (c)(1),
(2) Date: Mar. 22, 2021

(87) PCT Pub. No.: WO2020/060573
PCT Pub. Date: Mar. 26, 2020

(65) Prior Publication Data
US 2022/0043931 A1    Feb. 10, 2022

(51) Int. Cl.
    *G06F 21/62* (2013.01)
    *G06F 21/60* (2013.01)
    (Continued)

(52) U.S. Cl.
    CPC ........ *G06F 21/6227* (2013.01); *G06F 21/602* (2013.01); *G06F 21/64* (2013.01);
    (Continued)

(58) Field of Classification Search
    CPC .... G06F 21/6227; G06F 21/602; G06F 21/64; H04W 12/64; G08G 5/0026; G08G 5/0069
    See application file for complete search history.

(56) References Cited

U.S. PATENT DOCUMENTS 5,528,234 A    6/1996 Mani et al.
5,570,095 A    10/1996 Drouilhet, Jr. et al.
(Continued)

FOREIGN PATENT DOCUMENTS

EP    3236403    10/2017
WO    2019032162    2/2019

OTHER PUBLICATIONS

AirMap critical enablers: Five Critical Enablers or Safe, Efficient, and Viable UAS Traffic Management (UTM); Technical report; AirMap, Jul. 24, 2018.
(Continued)

*Primary Examiner* — Ayoub Alata
(74) *Attorney, Agent, or Firm* — Innovation Law Office; Dennis S. Schell

(57) ABSTRACT

Embodiments of the present disclosure provide improved systems (200, 400) and methods (500, 600, 700, 800) of identifying and managing unmanned (230) and manned (120a-b) air traffic. The systems and methods of the present disclosure allow for the establishment of communications that both protects and shares identity and other informational data. The exemplary system is a dynamic secure identification network system enabling users of the system, including aircraft and aircraft operators 250, to engage with all users of the system and share identification information through a permission-based network system, for example, a blockchain based system. The system enables varying levels of identity and other information to be communicated about each aircraft system located within the ecosystem and being queried by a user. Aircraft systems may include operated and/or autonomous aircraft systems.

22 Claims, 8 Drawing Sheets

(51) Int. Cl.
  *G06F 21/64* (2013.01)
  *G08G 5/00* (2006.01)
  *H04W 12/64* (2021.01)

(52) U.S. Cl.
  CPC ......... *G08G 5/0026* (2013.01); *G08G 5/0069* (2013.01); *H04W 12/64* (2021.01)

(56) References Cited

U.S. PATENT DOCUMENTS

| | | | |
|---|---|---|---|
| 6,681,158 | B2 | 1/2004 | Griffith et al. |
| 8,886,459 | B2 | 11/2014 | Stefani et al. |
| 8,977,481 | B1 | 3/2015 | Downs |
| 9,087,451 | B1 | 7/2015 | Jarrell |
| 9,412,278 | B1 | 8/2016 | Gong et al. |
| 9,646,502 | B1 | 5/2017 | Gentry |
| 9,658,619 | B1 | 5/2017 | Bethke |
| 9,805,273 | B1 | 10/2017 | Seeber et al. |
| 10,365,646 | B1 | 7/2019 | Farnsworth et al. |
| 10,420,062 | B2 | 9/2019 | Kim et al. |
| 10,733,894 | B1 | 8/2020 | Beard et al. |
| 2007/0236366 | A1 | 10/2007 | Gur et al. |
| 2010/0066604 | A1 | 3/2010 | Limbaugh et al. |
| 2011/0246002 | A1* | 10/2011 | Shavit .................. G08G 5/0043 701/14 |
| 2011/0299732 | A1 | 12/2011 | Jonchery et al. |
| 2012/0182161 | A1 | 7/2012 | Rutherford et al. |
| 2013/0217332 | A1 | 8/2013 | Altman et al. |
| 2014/0156114 | A1 | 6/2014 | Aymeric et al. |
| 2014/0342760 | A1 | 11/2014 | Moldavsky et al. |
| 2015/0106900 | A1 | 4/2015 | Pinski et al. |
| 2015/0260824 | A1 | 9/2015 | Malveaux |
| 2016/0078759 | A1 | 3/2016 | Merayoff et al. |
| 2016/0140851 | A1 | 5/2016 | Levy et al. |
| 2016/0247404 | A1 | 8/2016 | Srivastava et al. |
| 2017/0039424 | A1 | 2/2017 | Nerayoff et al. |
| 2017/0160740 | A1 | 6/2017 | Srivastava et al. |
| 2017/0160751 | A1 | 6/2017 | Pierce et al. |
| 2017/0248969 | A1 | 8/2017 | Ham et al. |
| 2017/0255802 | A1 | 9/2017 | Falk et al. |
| 2017/0261604 | A1 | 9/2017 | Van Voorst |
| 2018/0086451 | A1 | 3/2018 | Vaughn et al. |
| 2018/0090012 | A1 | 3/2018 | Jo et al. |
| 2018/0091908 | A1 | 3/2018 | Goel et al. |
| 2018/0107209 | A1 | 4/2018 | Hardee et al. |
| 2018/0107213 | A1 | 4/2018 | Kuhara |
| 2018/0111683 | A1 | 4/2018 | Di Benedetto et al. |
| 2018/0114450 | A1 | 4/2018 | Glaab et al. |
| 2018/0128895 | A1 | 5/2018 | Seeber et al. |
| 2018/0129881 | A1 | 5/2018 | Seeber et al. |
| 2018/0141656 | A1 | 5/2018 | Heinonen et al. |
| 2018/0144644 | A1 | 5/2018 | Heinonen et al. |
| 2018/0157255 | A1 | 6/2018 | Halverson et al. |
| 2018/0165968 | A1 | 6/2018 | Clark et al. |
| 2018/0165972 | A1 | 6/2018 | Zelenka |
| 2018/0194455 | A1 | 7/2018 | Park et al. |
| 2018/0211263 | A1 | 7/2018 | Gong et al. |
| 2018/0222600 | A9 | 8/2018 | Matos |
| 2018/0253092 | A1 | 9/2018 | Trapero Esteban et al. |
| 2018/0262501 | A1 | 9/2018 | Sugahara |
| 2018/0275654 | A1 | 9/2018 | Merz et al. |
| 2018/0293898 | A1 | 10/2018 | Redmann et al. |
| 2018/0305012 | A1 | 10/2018 | Ichihara |
| 2018/0357909 | A1 | 12/2018 | Eyhorn |
| 2018/0364741 | A1 | 12/2018 | Van Voorst |
| 2018/0373243 | A1 | 12/2018 | Russell |
| 2019/0012922 | A1 | 1/2019 | Selander et al. |
| 2019/0019418 | A1 | 1/2019 | Tantardini et al. |
| 2019/0031346 | A1 | 1/2019 | Yong et al. |
| 2019/0051190 | A1 | 2/2019 | Russell et al. |
| 2019/0075543 | A1 | 3/2019 | Kim et al. |
| 2019/0103030 | A1 | 4/2019 | Banga |
| 2019/0139421 | A1 | 5/2019 | Nilsson et al. |
| 2019/0147747 | A1 | 5/2019 | Arngren et al. |
| 2019/0295426 | A1 | 9/2019 | Nisson et al. |
| 2019/0394302 | A1* | 12/2019 | Kristiansson ......... H04L 9/3247 |
| 2020/0008059 | A1 | 1/2020 | Fox |
| 2020/0158814 | A9 | 5/2020 | Troxler |
| 2020/0310408 | A1 | 10/2020 | Carper |

OTHER PUBLICATIONS

AirAscend Proposes Electronic "License Plate" for Drones article; downloaded from <www.ariascend.com/ariascend-proposes-electronic-license-plate-for-drones/>(downloaded Jan. 12, 2021).

AriAscend Whitepaper: Downloaded from <https://www.dropbox.com/s/p4n6f5bcmkooph3/AriAscend%20Whitepaper.pdf?dl=0>(downloaded Jan. 12, 2021, no longer available).

Kjeld Jensen, Martin Skiver & Ulrik Pagh Schultz; Drone Identification and Tracking in Denmark Technical Report; Retrieved from< https://www.researchgate.net publication/348751258_Drone_Identification_and_Tracking_in_Denmark_Drone_Identification_and_Tracking_in_Denmark—downloaded Jan. 14, 2021.

UAS ID ARC Final Report: Downloaded from <https://www.faa.gov/regulations_policies/rulemaking/committees/documents/media/UAS%20ID%20ARC%20Final%20Report%20with%20Appendices.pdf >(downloaded Apr. 16, 2021).

Airmap—The Digital and Fully Automated Control Center for Drones; Downloaded from <https://www.airmap.com/utm-dashboard/ on Sep. 10, 2018.

PCT Written Opinion dated Jan. 18, 2019 for PCT/US 2018/52328 by the International Searching Authority.

European Search Report dated Apr. 7, 2022 for App. No. 18933900.5.

* cited by examiner

SYSTEMS AND METHODS OF IDENTIFYING AND MANAGING REMOTELY PILOTED AND PILOTED AIR TRAFFIC

TECHNICAL FIELD

Embodiments of this disclosure relate generally to identifying and managing air traffic, and more particularly to systems and methods for identifying and managing air traffic using networked database architectures implementing mediated access policies.

BACKGROUND

The rapidly evolving unmanned aircraft industry offers exponential benefits to humanity and unlimited possibilities through the imagination of various unmanned aircraft system stakeholders and operators around the globe. Unmanned aircraft have already disrupted some industries beyond aerospace and their impact will continue to expand as technology continues to progress beyond what's available on the market today. The unmanned aircraft industry's ability to make positive impacts is unquestionable, but today's regulatory barriers hinder its impact and create a landscape that restricts both competition and collaboration across the global market. If allowed, tomorrow's skies will be full of unmanned aircraft users who will advance civilizations and enhance the performance of economies well beyond aerospace. However, the aerospace industry, particularly the regulators within the aerospace industry, must first adopt a global identification, communication, and airspace protocol which eases barriers and enables today's visionaries to create these new and transformative technologies.

In today's aerospace environment, there is not an accurate and efficient method for managing and identifying aircraft, including manned/piloted and unmanned/remotely-piloted/autonomous aircraft, present within in a particular airspace. The lack of managing and identifying means presents unique issues, for example, with air traffic control coordination, privacy concerns, security concerns, business concerns, insurance and liability ambiguity, and others. There can be significant safety and privacy concerns when an observer of an aircraft is unable to verify certain aspects of the aircraft, for example the "who," "what," "where," "how," and "why" questions regarding the operators and operating purposes behind Unmanned Aircraft Systems (UAS) (e.g., drones). While manned aircraft have a fairly high barrier to access and operate them, unmanned aircraft are relatively inexpensively and easily obtained and operated, thus having little to now barrier to access and operate by anyone, providing widespread use and risk of abuse that is arguably more likely to lead to problems that must be addressed by local law enforcement than for manned aircraft.

For example, present technical solutions do not provide local law enforcement with access to information about pilots operating an aircraft. Law enforcement does not possess or have access to the specialized equipment and communications networks used by agencies such as ATC and NORAD which may or may not contain the information sought. Therefore, for manned aircraft, law enforcement must manually request any information from the FAA that may be on file with a flight plan or must intercept the aircraft upon landing to discover the identity of the aircraft. For unmanned aircraft, law enforcement must physically search for and locate the operator of the remote controller used to pilot the aircraft.

These safety and privacy issues also prevent or largely limit the execution of a various aircraft operation types, including automated flights and flights beyond visual line-of-sight. Further, military operations have these same concerns when the military is unable to classify an aircraft as "friendly" or "non-friendly." While the problems and solutions described herein may be most often directed toward UAS, it should be understood that many of the same problems and solutions are also relevant to manned aircraft.

The continued progression of UAS into everyday life, along with the expansion of the capabilities of UAS, has increased the threat of UAS use for nefarious, criminal, or terroristic intents. This has been widely realized in battlefields where UAS, including commercial off-the-shelf (COTS) UAS, have been utilized for targeting or ordinance delivery against both military soldiers and civilians alike. Safety threats can arise from any one of home-built, commercial, or military-specific UAS.

There is no current technical solution providing broad communication of identity information into the evolving Unmanned Traffic Management (UTM) ecosystem. Currently aircraft most commonly use transponders, such as civilian ADS-B and military based IFF transponders, which transmit information in a visual line-of sight manner. These transponder systems are limited in scope and are not effective in scaling to large numbers of aircraft in dense airspaces, and they can also oversaturate users with information if the systems were to be scaled to be used for UAS. Military-based IFF transponders are visual line-of-sight only and, as such, limited in transmitting information in urban, built, or varying terrain environments. Both ADS-B and IFF transponders require the addition of a physical transponder or emitting device to the aircraft, adding cost, power requirements, and weight that becomes impractical, particularly as the aircraft are scaled below a particular size. As a result, the vast majority of unmanned aircraft in use have no equipment that provides detection by or coordination with present ATC systems.

Present systems also do not account for identification or other information beyond what they are programed to communicate: typically an aircraft registration number, a squawk code assigned at the time of communication with ATC, position (including altitude), and the velocity vector. Additionally, use of existing transponder technology such as ADS-B require several hundred specialized radio stations dedicated to the particular implemented standard and use by only ADS-B equipped aircraft. Furthermore, no privacy or security provisions are included in present identity and management systems such as ADS-B. WIFI and bluetooth-based systems are in existence, but these systems focus on direct energy broadcast of information that is effective over only a very limited range and altitude.

Additionally, even if unmanned aircraft could be practically equipped with ADB-S transponder gear and/or ATC compatible radio gear, present dependence of those systems of a man-in-the-loop controllers, to provide flight clearance and traffic deconfliction provide a chokepoint that prevent scaling of present air traffic identity and management systems from being scaled up to satisfy the current and future projected volume of flight activity of unmanned systems. As an example, because prior systems were not designed to accommodate higher density operations, during the world's largest aviation convention held each year in Oshkosh, Wisconsin, all in-bound and out-bound aircraft are instructed to turn off their non-ADS-B transponders within 30 nm of the airfield.

As an example, a typical prior art environment 100 is illustrated in FIG. 1. Piloted aircraft 120a and 120b include transponders 122a and 122b respectively. Position and velocity data is determined by aircraft 120a and 120b and provided to transponders 122a and 122b using timing signals received from Global Navigation Satellite System (GNSS) 102. For one type of prior art transponders 122a and 122b, for example, transponder 122a and/or dedicated station 104 sends an interrogation radio signal received by transponder 122b. In response, if cooperating, transponder 122b sends identification data to transponder 122a and/or dedicated station 104. For another type of prior art transponder 122a periodically broadcasts identification, position, and velocity data which is received directly by transponder 122b and dedicated station 104, and may also be received by transponder 122b by rebroadcasting from dedicated station 104. A communications network such as a wide area network 106, for example, the communications networks comprising the internet, can transmit the identification, position, and velocity data from dedicated radio network station 104 to prior art identity and management system 110, for example, a prior art air traffic control system (ATC).

Typical unmanned aircraft systems (UAS) 130, including for example a remotely piloted or autonomous aircraft 132, are not in communication or observed by the prior art air traffic identity and management system 110, including not by dedicated station 104. The only communication link typical with the UAS 130 is between transceiver 134 of aircraft 132 and transceiver 142 of remote controller 140, enabling operator 144 to control the flight of aircraft 132. Therefore not the identity, position, and velocity, nor any other informational data about the UAS 130, including about operator 144 of the UAS, are accessible by aircraft 120a and 120b, air traffic identity and management system 110, dedicated station 104, or any other users, agencies, or devices, whether or not connected with WAN 106.

Consequently, it was realized by the inventor of the current disclosure that shortcomings with existing air traffic identity and management technology systems, and that improvements in those systems are needed. The current disclosure addresses these needs for technology systems which address shortcomings for both manned and unmanned systems.

SUMMARY

Embodiments of the present disclosure provide improved systems and methods of identifying and managing unmanned and manned air traffic. The systems and methods of the present disclosure allow for the establishment of communications protocols in a safe and sensible manner that both protects and shares identity at the same time.

The exemplary system for identifying and managing air traffic is a dynamic secure identification network system enabling users of the system, including aircraft and aircraft operators, to engage with all users of the system and share identification information through a permission-based network system, for example, a blockchain based system. The system enables varying levels of identification information to be communicated about each aircraft system located within the ecosystem being queried by a user. Aircraft systems may include operated and/or autonomous aircraft systems.

Adding to the complexity already present within the aerospace industry, regulated airspace is becoming more often accessed due to the growing population of UAS. A UAS in a particular airspace may need to interact with geofence-based technologies for flight planning and flight activity, and more particularly, may need to receive authorization from a regulatory entity before entering into some regulated airspaces. An air traffic identity and management system, such as is described in the disclosed embodiments, provides an aircraft operator with the information needed to gain access into airspace, in effect using the network identification information as a key to the airspace. Electronic geofences in the cyber domain may oftentimes be fluid and dynamic, resulting in a need for an aircraft identity network which can respond to rapidly-changing policy, including geofence rules and identity parameters in real-time, ensuring low transaction costs and scaling to higher volumes that than experienced with manned aircraft alone.

The identity and management system can be composed of many changing components that can be directly or indirectly engaged with the identification network. Airspace environments are evolving to include components that represent an Unmanned Traffic Management (UTM) ecosystem. A UTM ecosystem consists of many stakeholders, including system users, and technologies such as radars, radios, detection sensors, visual sensors, geofence software applications, databases, blockchain, Bluetooth devices, UAS, augmented or artificial reality (AR) systems, line-of-sight communications, command and control (C2) software, mobile devices, and more. As disclosed herein, the identity and management system is deployed as the underlying method for syncing the disparate information that constitutes a user, operator, or aircraft's identification. More specifically, the identity and management system is adaptable in nature allowing it the capability to incorporate legacy aircraft communications systems such as ADS-B and IFF transponders, but the identity and management system is unique in that it can collect disparate and disjointed information, sync the information together, and then make it widely available through a permissioned-based blockchain network system, particularly over a wide area network, for example, the communications networks comprising the internet.

One advantage of the identity and management system is that it is agnostic to technology and policy changes. WiFi, Bluetooth, other physical transponders, the user's physical devices and aircraft, will all evolve over time. The identity and management system can interact with legacy systems and is capable of evolving to respond to constant iteration and software update for improvement in efficiency, therefore allowing it to serve a UTM ecosystem through technology and policy evolutions that may require different types of user identity to be collected and transmitted and different user rules within the UTM ecosystem.

In accordance with a first aspect of embodiments of the present disclosure, a system for identifying and managing an aircraft system, can include one or more of: a secure database including: an aircraft registry storing informational data pertaining to the aircraft system; an operator registry storing informational data pertaining to an operator of the aircraft system; and an event journal storing informational data pertaining to flight activity of the aircraft system; and a processor executing a data access mediation application accessible via a wide area network and in communication with the secure database, the data access mediation application providing mediated access to the secure database to selectively provision and query the aircraft registry, operator registry, and event journal granted based on a policy and based on an access credential presented with a provision or query communication received via the wide area network. At least a portion of the informational data can be provisioned to the secure database by the aircraft system via a transceiver associated with the aircraft system and in communication with the wide area network and configured to communicate data pertinent to the aircraft registry, the operator registry, and the event journal, the data pertinent to the event journal including at least a position of the aircraft system.

An embodiment can also include a passive interrogation device in communication with the wide area network and configured for: storing an access credential; specifying a position in which the aircraft system is located to query, transmitting the access credential and a position query to the data access mediation application; and receiving from the access mediation application a subset of informational data pertaining to at least one of the aircraft system, an operator of the aircraft system, and flight activity of the aircraft system, based in part on the mediated access to the informational data granted to the access credential under the policy. In one embodiment the passive interrogation device includes a handheld computer device. In another embodiment the passive interrogation device includes an air traffic control workstation.

At least one of the position of the aircraft system and the position in which the aircraft system is located can be based at least in part on GPS trilateration. The mediated access can include masking and substituting select informational data. The secure database can include an aeronautical registry storing informational data pertaining to airspace regulatory and geographic features. The secure database can include a local regulatory registry storing informational data pertaining to local regulations.

In at least one embodiment, the aircraft system includes an unmanned aircraft, and can also include a remote controller configured for operating the unmanned aircraft, the remote controller receiving from the unmanned aircraft informational data pertinent to the event journal; and the transceiver is associated with the remote controller and provisions the informational data pertinent to the event journal to the secure database via the wide area network. The data pertinent to the event journal can includes a position of the remote controller.

In at least one embodiment the aircraft system includes an aircraft and the transceiver is associated with the aircraft and provisions the informational data pertinent to the event journal to the secure database via the wide area network. The transceiver can be a cellular network transceiver. The transceiver can be capable of communicating with aviation specific radio transponders and ground stations.

In at least one embodiment, the secure database uses blockchain technology.

In accordance with another aspect of embodiments of the present disclosure, a method of identifying and managing aircraft, can include one or more of the steps of: provisioning a secure database including: an aircraft registry storing informational data pertaining to the aircraft, an operator registry storing informational data pertaining to an operator of the aircraft, and an event journal storing informational data pertaining to flight activity of the aircraft; coupling the secure database to a wide area network; implementing a mediated access policy for determining access to the secure database based upon an access credential; coupling a processor to the secure database; providing and executing a data access mediation application on the processor, the data access mediation application providing mediated access to the secure database via the wide area network; providing a data access request for at least one of the aircraft registry, operator registry, and event journal; and providing mediated access to one or more of the aircraft registry, operator registry, and event journal based on the access credential and the policy.

At least one embodiment further includes the step of using a transceiver to provision at least a portion of the informational data of the secure database, the transceiver associated with the aircraft, in communication with the wide area network, and configured to communicate data pertinent to the aircraft registry, the operator registry, and the event journal, including at least a position of the aircraft.

In at least one embodiment the aircraft system includes an unmanned aircraft and the transceiver is associated with the aircraft, the aircraft system can include a remote controller configured for operating the unmanned aircraft and the transceiver is associated with the remote controller. The data pertinent to the event journal can include a position of the remote controller.

In at least one embodiment the method includes the steps of: providing a planned flight activity of the aircraft; and approving or denying the planned flight activity based at least in part on at least one of a priority associated with the planned flight activity and the access credential, and based on at least in part on one of traffic and airspace regulatory features. The step of approving or deny the planned flight activity can be further based at least in part on information from the local regulatory registry. The method can further comprise the steps of: providing a velocity vector of the aircraft; and approving or denying continuation of the velocity vector based at least in part on at least one of a priority associated with the planned flight activity and the access credential, and based on at least in part on one of traffic and airspace regulatory features.

The step of provisioning a secure database can further include an aeronautical registry storing informational data pertaining to airspace regulatory and geographic features.

The method can further comprising the steps of: providing a passive interrogation device in communication with the wide area network; configuring the passive interrogation device for: storing an access credential, specifying a position in which the aircraft is located to query, and transmitting the access credential and a position query to the data access mediation application; and receiving from the access mediation application a subset of informational data pertaining to at least one of the aircraft, an operator of the aircraft, and flight activity of the aircraft, based in part on the access to the informational data granted to the access credential under the policy.

The step of receiving may be delayed until at least one of the aircraft and the passive interrogation device are in communication with the wide area network.

The passive interrogation device can include a handheld computer device and the step of specifying a position can include aiming a sensor of the handheld computing device toward the aircraft; determining a relative position of the aircraft to the handheld computing device; and computing a geographic position in which the aircraft is located based on the relative position and the geographic position of the handheld computing device. The step of providing mediated access can include masking and substituting select informational data.

In accordance with a yet another aspect of embodiments of the present disclosure, an identification module for an aircraft system can include one or more of: a memory storing an aircraft identification key and an operator credential; and a wireless transmitter configured to communicate data to a wide area network, including data pertinent to the aircraft identification key, an operator credential, and a position of the aircraft. The aircraft system can include an unmanned aircraft and a remote controller for the operator. The identification module can be associated with the remote controller. The data communicated to a wide area network can include data pertinent to a position of the remote controller. The data communicated can include identity of an instance of control software associated with the remote controller. The module can be capable of receiving GPS information for providing the position of the aircraft. The data communicated can include a velocity vector of the aircraft.

The identification module can include a receiver capable of receiving instructions in response to the position and velocity vector of the aircraft. The data communicated include can a planned flight activity of the aircraft. The identification module can further comprise a receiver capable of receiving instructions in response to the planned flight activity of the aircraft.

The data communicated can include data pertinent to an operator of the aircraft. Transmission of the data communicated may be delayed until the wireless transmitter is in communication with the wide area network.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
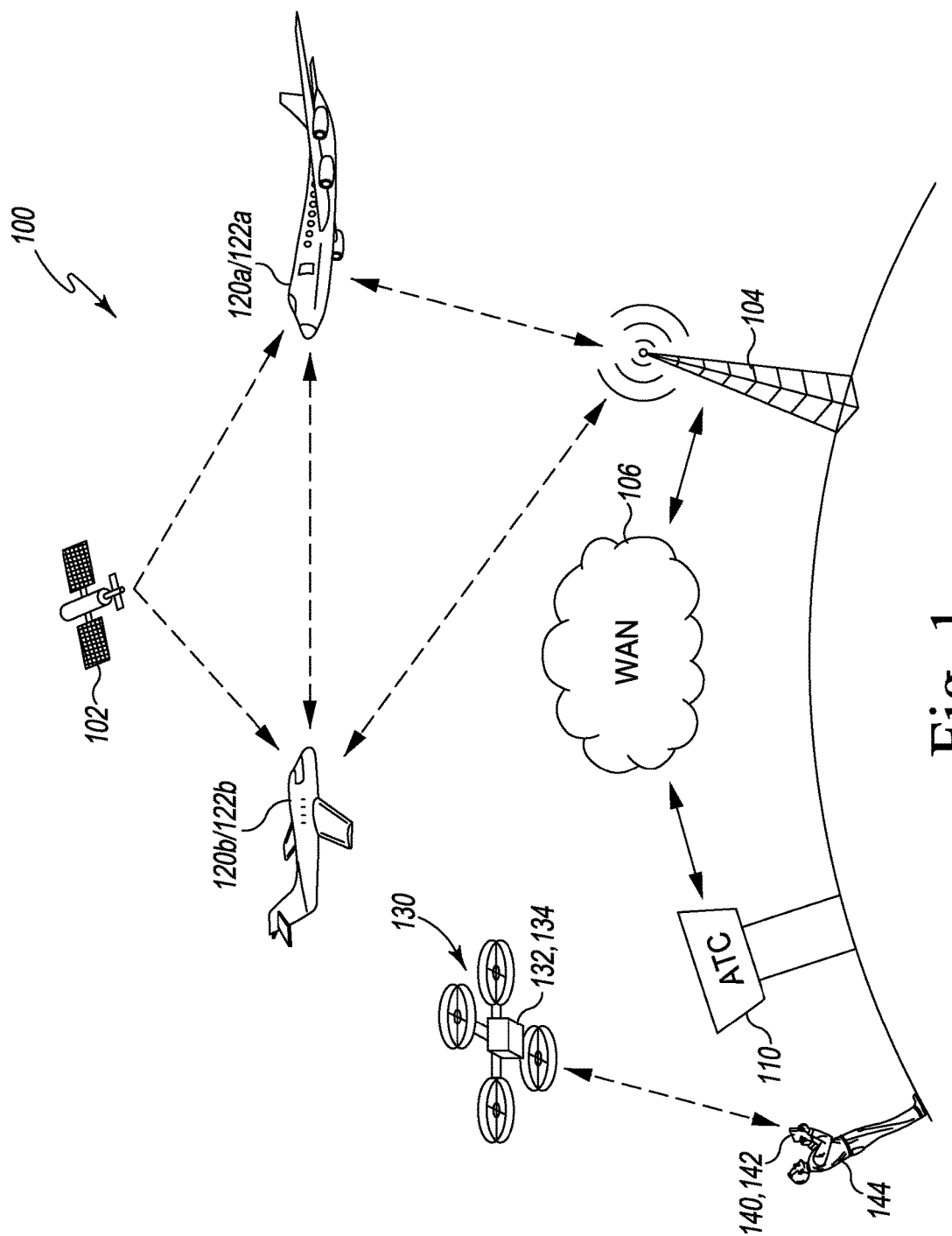
FIG. 1 is a prior art system for identifying and managing air traffic.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Figure 2:
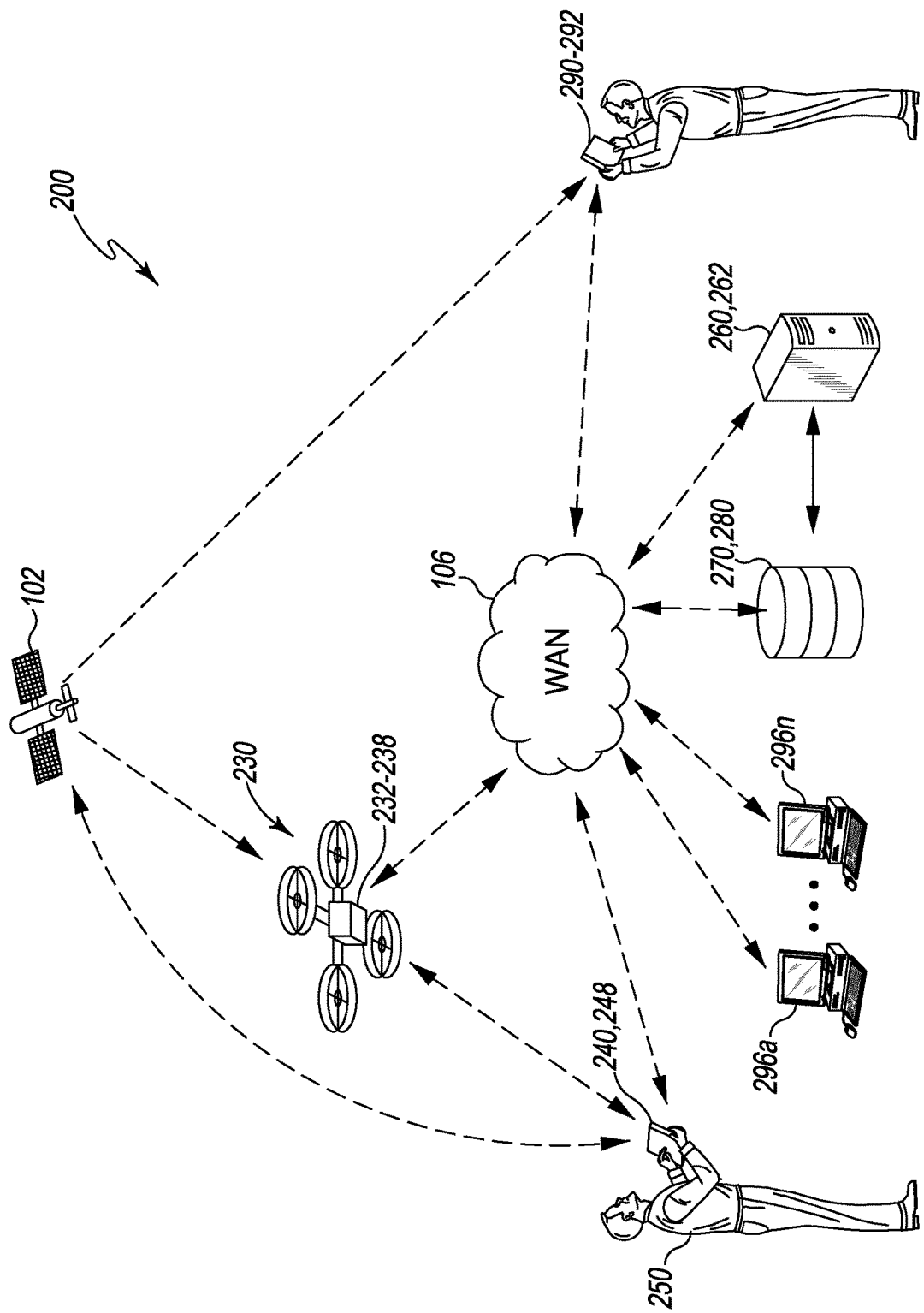
FIG. 2 is an exemplary system for identifying and managing unmanned and manned air traffic, according to the present disclosure.

The systems and methods of the present disclosure allow for the establishment of communications protocols in a safe and sensible manner that both protects and shares identity and other informational data at the same time. Referring to FIG. 2, and illustrative embodiment of an air traffic identity and management system 200 according to the present disclosure is illustrated. The system 200 can be used to identify and manage UAS 230 and piloted aircraft 120a-b, and generally includes one or more processors 260, an application layer 262, a data store layer 270, and a secure layer 280, for example a blockchain layer. Advantageously, system 200 is network based and can use an existing network such as a wide area network (WAN) 106; therefore, rather than depending on and requiring conductivity to a specialized, dedicated communication network, such as dedicated radio network stations 104 (FIG. 1), system 200 components and users only require a connection to WAN 106. For example, other devices or systems 296a-n, including users such as local law enforcement, existing air traffic control system 110, and the public, can access system 200 at processor 260 via WAN 106.

The UAS 230 includes aircraft 231 and optional remote controller 240, used by operator 250 to remotely pilot aircraft 231. For some UAS 230, the aircraft 231 is controlled autonomously, whether onboard the aircraft of using a remote processor, for example, one of devices 296a-n running an instance of control software (not shown). A typical aircraft 231 can including identity module 232 enabling cooperation with system 200, identity module including, for example, one or more of transceiver 234, memory 236, and processor 238 to transmit and receive informational data pertinent to system 200 as further discussed below, including for example, data pertinent to identity and position and velocity, for example as determined from timing signals received from GNSS 102. In at least one embodiment, transceiver 234 is capable of direct communication with WAN 106. In at least another embodiment, communication with WAN 106 is via controller 240. For example, controller 240 can include one or more of identity module 242, transceiver 244, memory 246, and processor 248. The transceiver 244 of controller 240 provides communication with transceiver 234 of aircraft 231, for example, via a secure radio link, and the controller 240 is in communication with WAN 106, for example, via a cellular network connection. As such, informational data associated with system 200 and stored locally in UAS 230 may be stored in memory 236 and/or memory 246 and processing in UAS 230 associated with system 200 in part may be in processor 238 and/or processor 248. For example, access credentials or informational data pertinent to access credentials associated with UAS 230 and/or operator 250 may be stored in memory 236 and/or memory 246 and used to access the application layer 262, data store layer 270, and secure layer 280.

The illustrative air traffic identity and management system 200 may also include passive interrogation device(s) 290. As will be described further below, the passive interrogation device 290 can be any processor, including handheld computing devices such as smartphones and tablets, that provides a position of interest to processor 260 to query. For example, sensor 291 may include a camera, GNSS receiver, and solid state accelerometer that together function with process 292 to determine the geographic position of device 290, a relative position of UAS 230 at which the camera of the device is centered on, and thus a geographic position of device the UAS. The device 290 can then transmit the position of the UAS 230, for example, approximate coordinates and altitude, in a query to processor 260, along with a user credential. As further described below, processor 260 can receive and provide at device 290 a response from processor 260 relating to the UAS 230 and/or operator 250, including for example, informational data pertinent to flight activity authorization, identity, and even the location of operator 250, depending on access policy and the authorization associated with the user and/or device 290.

In one illustrative system 200, UAS 230 and interrogation device 290 may be capable of direct communication, with UAS 230 either broadcasting or responding to an interrogation request from device 290 and send informational data that can be received directly by the interrogation device 290. For example, the direct communication may be via commonly featured wireless connections such as WIFI or BLUETOOTH, or a specific aviation related technology such as ADS-B.

Figure 3:
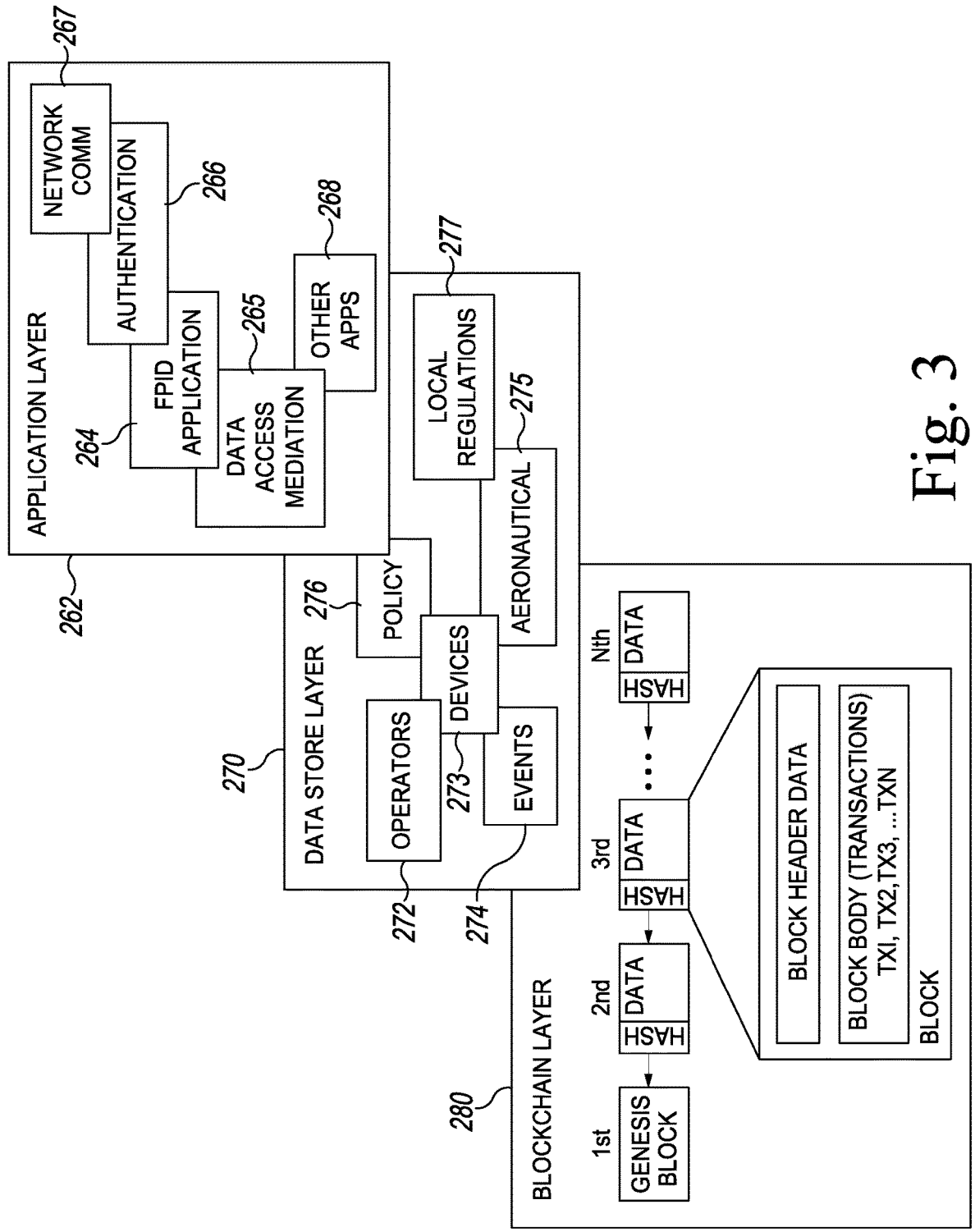
FIG. 3 is a block diagram of an exemplary application and database structure of the system of FIG. 2, according to the present disclosure.

Referring to FIGS. 2 and 3, the processor 260 may be a dedicated backend, distributed, virtual, cloud, or other former of server or other processor known in the art. An application layer 262 may include one or more of an access application 264, data access mediation application 265, authentication application 266, network communication 267, and other applications 268, including, for example, third-party apps that use system 200. The applications 264-268 may be located on a single processer 260, or may be located one or more of various processors, including processors associated with UAS 230, remote controller 240, passive interrogation device 290, and other devices and systems 296a-n. Additional applications pertinent to aspects of system 200 as are known in the art may also be included in the application layer 262.

A data store layer 270 may include informational and other data pertinent to system 200 and its operation, including but not limited to one or more databases or other localized or distributed data storage architecture, including but not limited to the following registries and/or journals (non-limiting terms simply illustrative one or more collections of related informational data). An operator registry 272 can include data pertinent to operators such as remote and non-remote pilots. A device registry 273 can include data pertinent to aircraft or other devices, including for example, UAS 230 and aircraft 120a-b. An event journal 274 can include data pertinent to planned, active, or historical flight or other activity. An aeronautical registry 275 can include data pertinent to airspace, airports, geographic features, and other information pertinent to flight activity, including airspace restrictions and other regulatory information. A policy registry 276 can include informational data relating to user access to application layer 262, data store layer 270, and security layer 280, including for use by data access mediation application 265, relating to flight approval and priority for UAS 130, aircraft 120a-b, and operator 140, and relating to other aspects of interaction with and functional aspects of system 200. A local regulation registry 277 may include data pertinent to a geographic localized area, for example, state, county, city, or other territorial laws, regulations, emergency operational implications and/or conditions that may be separate from and/or more localized than typical airspace operating restrictions. Additional informational data and system data pertinent to aspects of system 200 as are known in the art may also be included in the data store layer 270.

A security layer 280 may include data integrity and security aspects of system 200, for example, application of cryptographically linked data records, for example, blockchain technology, to access and content for system 200, for example, permissions-based blockchain as is discussed further below.

Figure 4:
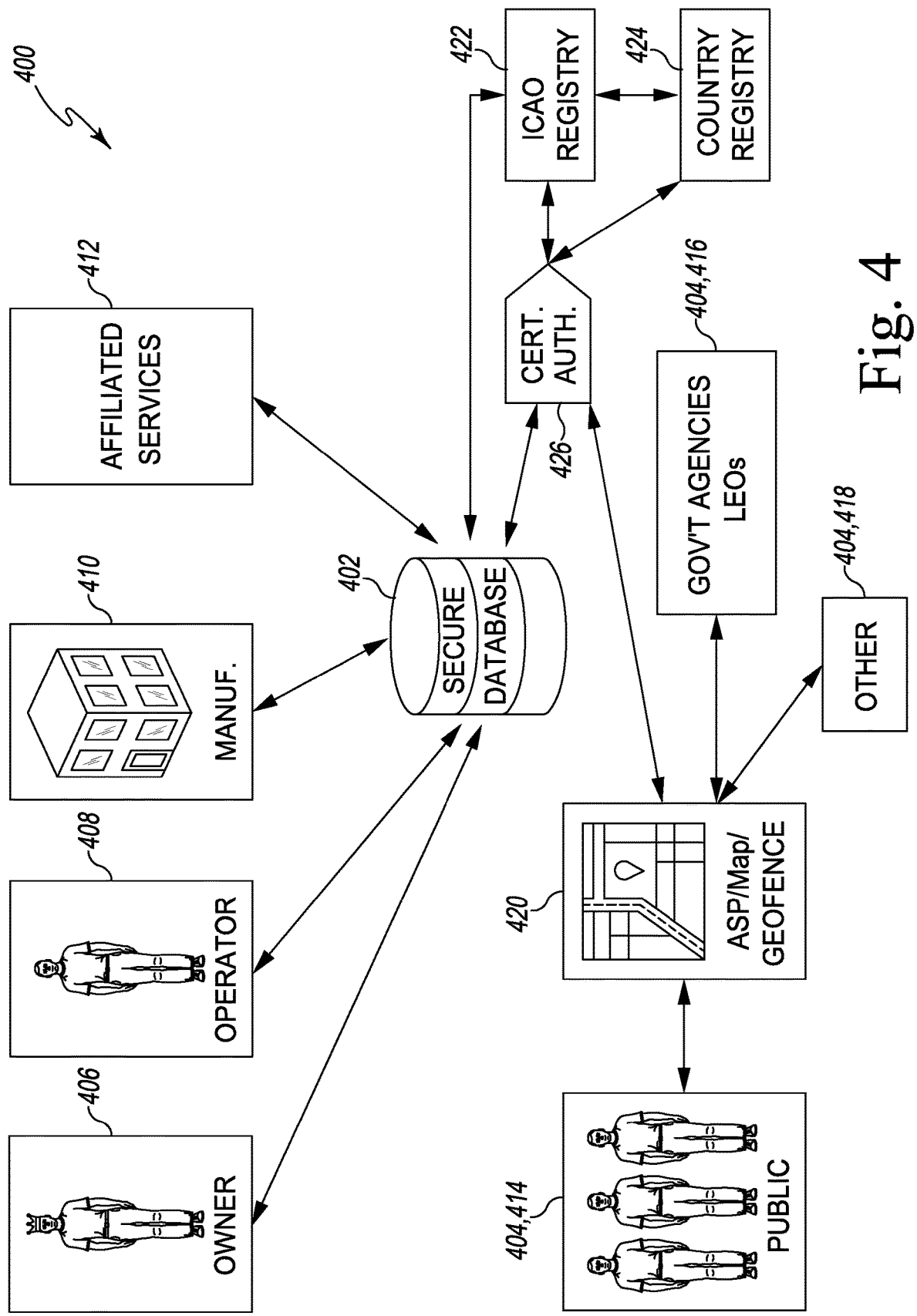
FIG. 4 is a block diagram of an exemplary system ecosystem, according to the present disclosure.

Depicted in FIG. 4 is an exemplary secure database ecosystem 400 implemented by the identity and management system 200, according to embodiments of the present disclosure. The ecosystem 400 collects and shares information, for example, for a manned or unmanned air traffic system, or alternatively, an air traffic identity and management system comprising both manned and unmanned aircraft. At the center of the ecosystem 400 is the multi-layered secure database 402 as described herein for storing and selectively providing access to the ecosystem 400 data.

The secure database 402 acts as a trusted broker of all information provided and collected within the ecosystem 400. Any ecosystem stakeholder (user) 404 may connect to the ecosystem 400, for example, using an Application Programming Interface (API), such as an unmanned traffic management system (UTM), and receive informational data pertaining to and/or provided by a multitude of sources. Such sources can include: aircraft owners 406, aircraft operators 408, aircraft and system manufacturers 410, and affiliated services 412. Informational data pertaining to aircraft owners 406 can include, without limitation, certificates, authorizations, insurance information, regulatory information, point of origin data, and/or affiliated business information. Informational data pertaining to aircraft operators 408 can include, without limitation, training data, operator competency-related data, operating activity logs, and/or operator currency. Additionally, informational data pertaining to aircraft and system manufacturers 410 can include, without limitation, firmware information, aircraft model, aircraft serial number, transceiver information, remote controller information, and/or maintenance records. Affiliated services 412 can include any additional data which may be provided by, for example, employers, insurance, aircraft databases, associations, community organizations, flight logs, certificate authorities, government regulators, manufactures, registries, owners, radars, detectors, other UTM services (e.g., AirMap, Consortiq, Geo.Network, JdxMobile, DJI, etc.), software dashboards, training bodies, and more. All of the source information may be provided to or by an aircraft system through pre-existing peripherals and devices associated with the aircraft, including the aircraft and/or controller themselves, and the telemetry and data from that aircraft.

Other sources of pertinent information may be international regulatory bodies, such as the International Civil Aviation Organization (ICAO) 422, or an individual country's regulatory body 424, such as the Federal Aviation Administration (FAA) in the United States. ICAO, for example, maintains the standards for aircraft registration (e.g., tail numbers), including the alphanumeric codes that identify the country of registration (e.g., aircraft registered in the United States have tail numbers starting with N). ICAO is also responsible for issuing alphanumeric aircraft type codes containing two to four characters. These codes provide the identification that is typically used in flight plans. The FAA, on the other hand, is a United States national authority with powers to regulate all aspects of civil aviation, including the construction and operation of airports, air traffic management, and the certification of personnel and aircraft. A certificate authority 426 may review data provided by an individual country registry 424, or an international body such as ICAO 422, to ensure and establish that the data has met a specific set of requirements before providing it to the secure database 402. With the advent and growth of UAS it is also conceivable that local agencies or regulatory bodies that relate to local privacy, noise, public safety, risk, and other aspects of flight activity effecting local interests will also play a role in regulation, including identifying and managing UAS.

Once the third-party information is collected by the secure database 402, the information is then broadcasted throughout the ecosystem 400, or the identity and management system network, identifying the aircraft's physical location through GNSS, geographic, geofence, or other service or hardware, including radar and radio frequency (RF) technologies, which utilize location based-services.

Stakeholders 404 are any ecosystem 400 user engaging with the ecosystem 400 through an Application Program Interface (API) 420, such as the identity and management system mobile application, a third-party API, or any subsystem or peripheral of the system. Stakeholders may include, but are not limited to, the general public 414, government agencies and law enforcement officers 416, or any other users 418, such as aerospace regulators. The ecosystem 400 APIs 420 interconnect with third-party Geographic Information Systems (GIS), mapping, geofence, and location-based services to share and display an identification of an aircraft and its geographic position across a wide variety of service providers, therefore synchronizing the communication of the aircraft's identity across the network. To accomplish this, the ecosystem 400 is configured to broadcast or otherwise provide the user's identity and additional information to third-party APIs, enabling a user of the ecosystem 400 to communicate their information to all ecosystem stakeholders 404 without regard to which API the stakeholder 404 is using to access the information.

The ecosystem 400 can determine what levels or types of aircraft identity information is shared to a querying stakeholder 404, for example, based on the ecosystem's 400 permission-based blockchain technology. Some stakeholders will only see whether the aircraft is cooperative and approved to fly in the airspace or they may see greater details and personally identifiable information from that aircraft and its operator/pilot. For privacy and security of the aircraft owners 406, operators 408, and manufacturers 410, some stakeholders 404, such as government stakeholders 416, may receive additional and/or more detailed information than what would be provided to a different stakeholder, for example, a general public stakeholder 414. The following are examples of queries from and data points provided to particular stakeholders 404 having varying levels of access credentials.

For a query about an aircraft from the general public 414, the data access mediation application 265 (FIG. 3) may only share data indicating whether the UAS 130 or other aircraft is authorized or unauthorized to be airborne in the particular airspace queried by the user and possibly whether the UAS or other aircraft is known (cooperating) or unknown (non-cooperating) with the system 200. The system 200 can make such an authorization/non-authorization determination by reviewing the data provided from the air traffic regulating bodies participating in the ecosystem 400, for example, if the FAA has initiated a geofence to temporarily restrict air traffic within a particular airspace. The secure database 402 may also share the current geographic position of the aircraft and/or the current geographic position of and/or other information about the aircraft operator, which may be a human or a machine, if the aircraft is unmanned. These geographic positions can be reported in real-time as they will in most circumstances change while the aircraft is in flight, or if not available in real-time due to lack of connectivity with the WAN 106, may be available at a later time as discussed herein.

For a query about an aircraft from a law enforcement agency 416, the data access mediation application 265 may share any information about the aircraft which may be appropriate for law enforcement to receive, such as the identity of the owner, operator, manufacturer, flight authorization status, location of the operator and/or remote controller, and/or its flight history. For example, a law enforcement agency 416 providing protection for an event or location may elect to take counter-UAS or other defensive action if a query using system 200 determines a UAS is unauthorized and/or non-cooperative with the system 200. Similarly, a user affiliated with a regulatory agency 418 may be provided access to the same or a subset of the data provided to law enforcement user 416, as appropriate.

Figure 5:
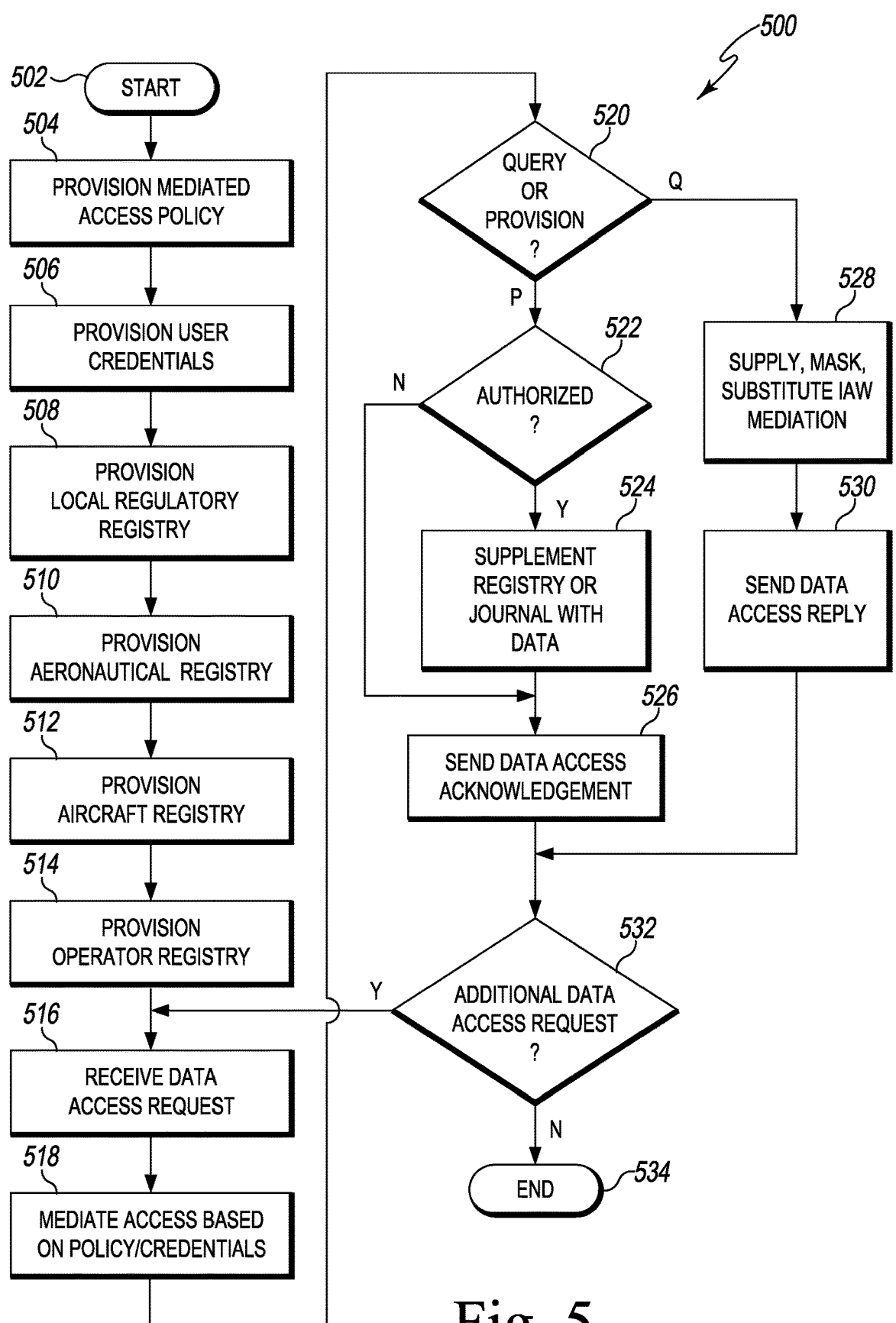
FIG. 5 is a process diagram of an illustrative embodiment of a method of mediating access to information requested by a system user, according to the present disclosure.

Depicted in FIG. 5 is a process diagram of an illustrative embodiment of a method of mediating access to information requested by a user of system 200. The method 500 begins 502 with an administrator of the secure database provisioning a mediated access policy 276 at step 504. Advantageously, the access policy may be a dynamic policy which reacts and responds to real-time situations, such as temporary access credential modifications instituted by law enforcement or regulatory bodies in response to particular events, as well as to policy changes promulgated by legislative, administrative law, or other processes. Next, at step 506, user set up a user credential via an API or other system affiliated user interface with the system 200. These credentials will ultimately be reviewed by the data access mediator of the secure database once a query or other request for access is made within system 200. Next, at steps 508, 510, 512, and 514, a system administrator and/or users provision the local regulatory registry 277, the aeronautical registry 275, the aircraft registry 273, and the operator registry 272, respectively. In additional to relevant airspace and airport information, the aeronautical registry 275 may include a geographic database, or the GIS, mapping, and location-based services, may be provided by third-party services and provisioned to work in affiliate with and overlay data in conjunction with the system 200 and identity and management system ecosystem. The airspace, aircraft, and operator, and optionally the manufacturer registries are each provisioned by inputting each respective portion of data into the secure database. Upon the completion of these steps, which may be performed in any order, the identity and management system ecosystem is prepared to engage with the stakeholders.

At step 516, the application 264 receives a data access request, or query, from a user. Queries may be made through APIs, map based services, third party applications that have API connections to the application and/or data store layers 270 and 280, and IOT devices, including with augmented or artificial reality capabilities. For example, a user can point a mobile device (e.g., a handheld computer device, tablet or mobile phone), such as passive interrogation device 290, at a UAS 230 in the sky to query information about that aircraft. As described herein, and continuing at step 518, the data access mediation application 265 can mediate the access to the information based on the existing access policy and the stakeholder's access credentials. At step 520, the secure database determines whether the access requested is with regard to a data query or a data provision, and the results of that stakeholder's query may thereafter be provided based on the access level of stakeholder. For a data query, at step 528, the application 265 may first review the access credentials and determine whether to supply the data unaltered, or mask or substitute any data to affect the current policy with regard to the access credentials. In some instances, a law enforcement or military aircraft may require anonymity, and in such instance the data provided about the aircraft in response to a query may be restricted or substituted. Once these steps have been completed, at step 530 the data access reply is provided to satisfy the query. In other cases, for example, an inquiry by the general public, the response may simply be whether the UAS or other aircraft flight activity is authorized, unauthorized, or unknown to system 200.

If, at step 520, the secure database instead determines that a provision query has been made, the method continues to step 522 to determine whether such a provision is authorized, for example, an operator 250 updating their currency or other information. If the provision was authorized, such as if the request was received from a user with the appropriate access credentials to provision the database, at step 524, the secure database will accept the provision and supplement the registry or journal with the data provided with the request and send the data access acknowledgment back at step 526.

Once all query and provision requests have been completed, at step 532, the identity and management system will wait for the next data access request from a user. Access requests may be initiated manually by a person, or may be an automated user in response to events, software algorithms, AI, or other machine based functionality. Once a request is made, the process repeats beginning again at step 516, otherwise the process ends 534.

Figure 6:
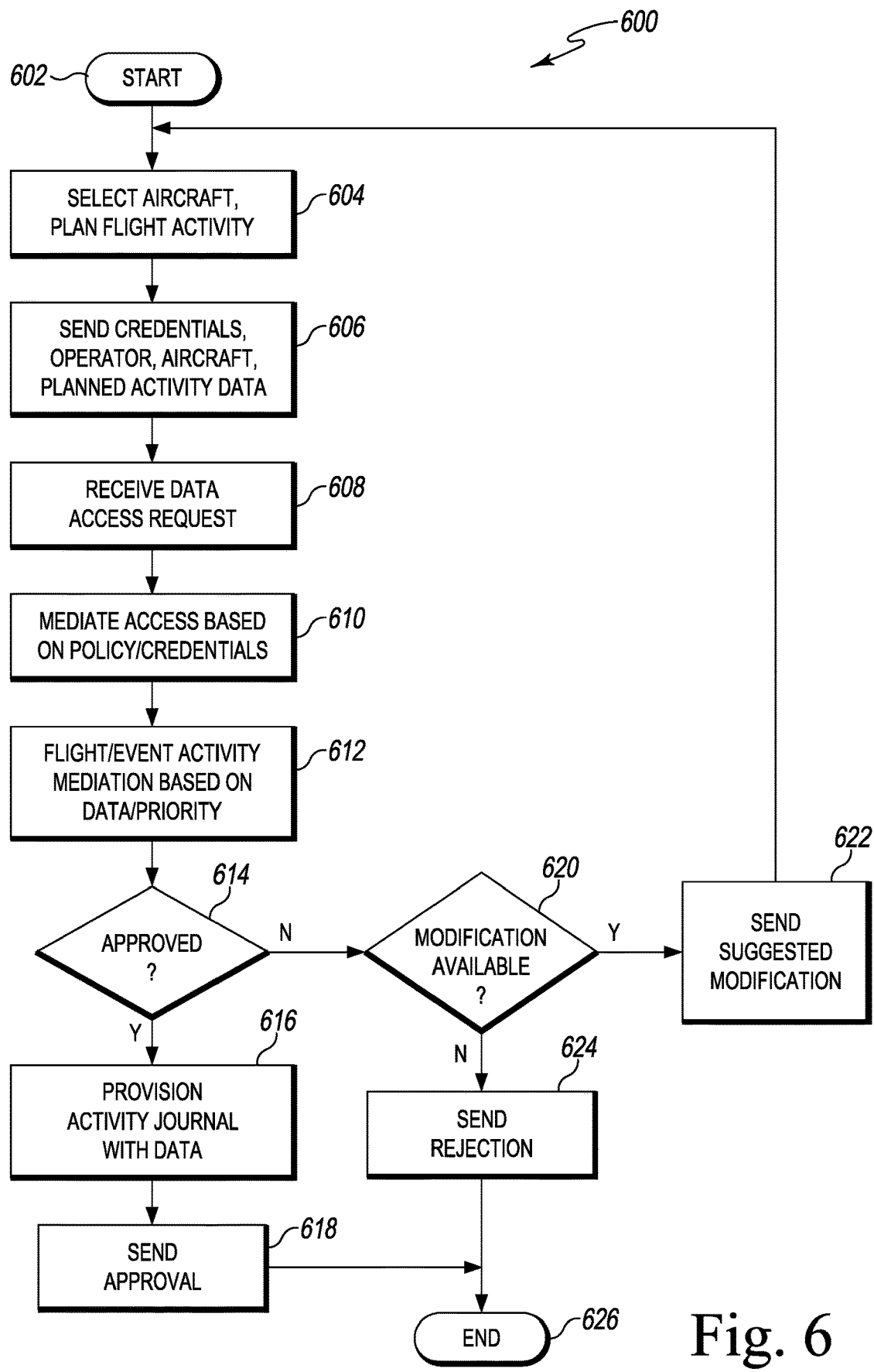
FIG. 6 is a process diagram of an illustrative embodiment of a method of filing a flight plan with the air traffic identity and management systems of the present disclosure.

Depicted in FIG. 6 is a process diagram of an illustrative embodiment of a method 600 for registering a flight plan with the air traffic identity and management system 200 of the present disclosure. The method 600 begins at step 602 and moves to step 604 wherein an aircraft operator/pilot selects an aircraft and planned flight activity. Once this step is complete, at step 606, the operator/pilot then sends, for example via other apps 268, or otherwise causes access to his/her credential, operator information, aircraft information, and planned activity data to the application 264, and the system receives such data at step 608. At step 610, the system, particularly the data access mediation application 265 mediates the operator/pilot's access based upon the operator/pilot's access credentials and the current access policy 276 as described by select portions of process 500. At step 612, the application 264 or other apps 268 will review the flight plan/event activity with regard to the known airspace restrictions, operator qualifications, and other data and/or considerations/policy shared to the air traffic identity and management system 200 which may affect the submitted plan and, at step 614, will determine whether the plan may be approved in accordance with the policies and activities which will be in affect at the time of the planned flight. If the plan is approved, at step 616, the system 200 will provision the activity journal with the planned flight activity and at step 618 send the approval back to the operator/pilot and cease the process at step 626. If the plan is not in condition for approval, at step 620 the system will determine whether a modification is available which would put the plan in condition for approval. If there is no such modification, at step 624, the system will notify the operator/pilot that the planned flight activity has been rejected and the process will cease at step 626. If a plan modification is available, at step 622, the system will send the operator/pilot the suggested modification and/or approve an amended planned activity and return the process back to the beginning at step 604.

Figure 7:
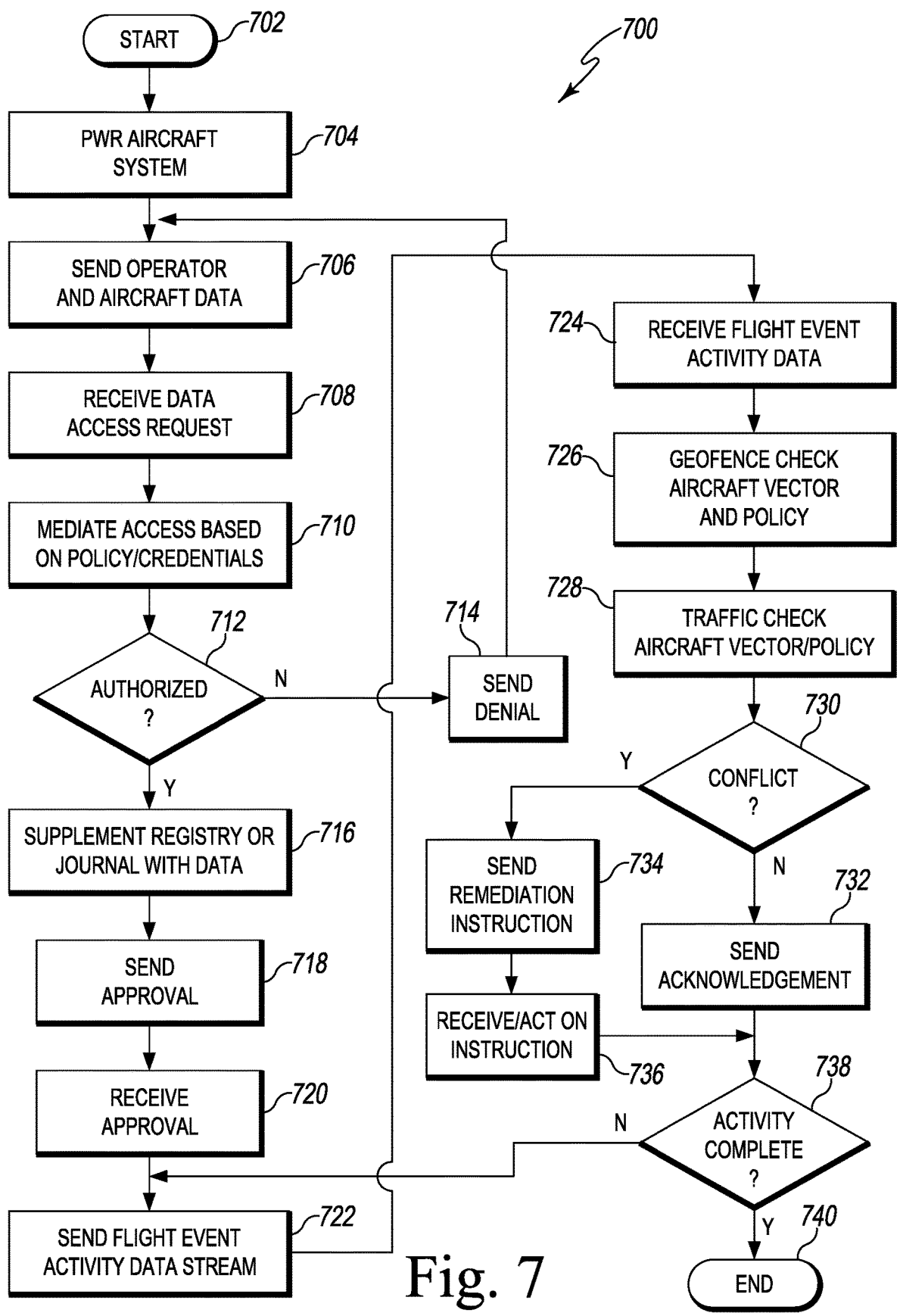
FIG. 7 is a process diagram of an illustrative embodiment of a flight activity including geofencing, according to the present disclosure.

With reference to FIG. 7, the air traffic identity and management system 200 of the present disclosure's use of identity, for example, as a "key" can work with regulators and Unmanned Traffic Management (UTM) Service Providers (USS) to gain access to segregated airspace based upon the key or identity requirements to access this airspace. Some GIS, mapping, and location-based services may have the authority to communicate with the identity and management system 200 to allow or deny the aircraft's entry into a physical airspace based on its information key. Such airspace could be Temporary Flight Restricted (TFR) airspace, VIP airspace, military airspace, airspace around critical infrastructure, or other local or federal airspace and/or flight activity designations within a changing and dynamic air traffic environment. As described by process 700, an area of interest may be geofenced to restrict access to that and be broadcasted to the network. For example, only certain operators or other users with the proper identity and credentials may gain access to this airspace and begin a flight activity within or fly through the geofence boundary.

Depicted in FIG. 7 is a process diagram of an illustrative embodiment of a flight activity including a geofence, according to embodiments of the present disclosure. The process 700 begins at step 702 and proceeds to step 704 wherein the aircraft system is powered up and, at step 706, the operator and aircraft data is sent, for example, by the aircraft 231 or controller 240 of a UAS 230. At step 708, the application 264 or other app 268 receives the data access request. At step 710, the system 200, particularly the data access mediation application 265, mediates the access request based upon the operator/pilot's access credentials and the current access policy as described by select portions of processes 500 and 600. At step 712, the system will determine whether commencement of the flight activity may be approved in accordance with the airspace policies and activities which will be in affect at the time of the flight. If the activity is not approved, at step 714, the system will send the denial and return to step 706 to wait for a new request to be submitted. If the activity is approved, at step 716, the system will supplement the activity journal with data and at step 718 send the approval to the operator/pilot. At step 720, the operator/pilot receives the approval and, at step 722, sends the flight event activity data stream in real-time as the flight is in progress. The system will continually receive, at step 724, the data stream and make determinations about whether the aircraft is operating outside of the authority provided it by the approval. At steps 726 and 728, in no particular order, the system can specifically check the aircraft position and flight data received with regard to the existing geofence boundaries and traffic conditions in the aircraft's airspace. At step 730, the system will analyze the data from steps 726 and 728 and determine whether a geofence boundary or traffic condition has been violated by the aircraft, including relative to a priority assigned to the flight activity in accordance with policy. If there is a conflict, at step 734, the system will send the operator/pilot remediation instructions. At step 736, the operator/pilot will receive those instructions, whether the instructions are provided to a pilot in the cockpit or by an unmanned system operator on the ground. In the case of an unmanned aircraft operator 250, the instructions may be provided to the operator through the unmanned system controller 240 or the operator's connected mobile device. At step 732, if there is alternatively no conflict with geofence boundaries or traffic conditions, the system will send the operator/pilot such acknowledgement and, at step 738, determine whether the activity is complete. If the activity is complete, the process ends at step 740, otherwise the process returns to step 722 wherein the flight activity data steam is again provided and processes accordingly.

Figure 8:
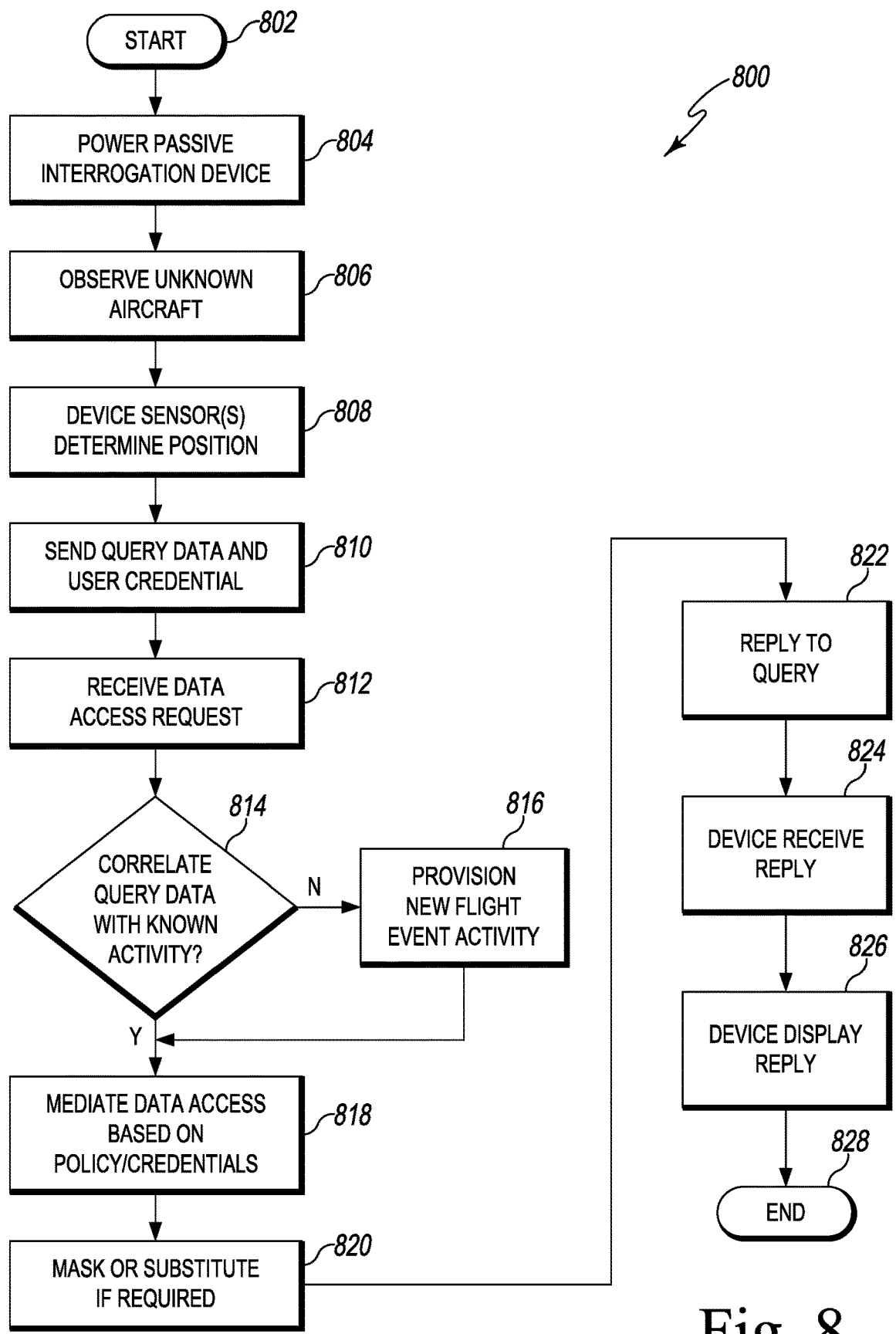
FIG. 8 is a process diagram of an illustrative embodiment of an aircraft identification query, according to embodiments of the present disclosure.

With reference to FIG. 8, any user, for example any person in the general public and interested in the identification of a manned or unmanned aircraft 230, can use a device 290 (e.g. a handheld computer device, tablet, or mobile phone) running an API 268 compatible with the air traffic identity and management system 200 of the present disclosure to identify the aircraft when the user points their device at the aircraft. The application 268 can utilize the smart phone's camera to visually identify the aircraft on the screen, and the system may use the geographic location of the device 290 along with the directional orientation the device is facing and triangulation techniques known in the art using the smart phone's movement and relative camera angles to the aircraft 230 to determine an estimated range to develop a geographic position of the aircraft 230 to search. the local airspace for aircraft that are operating based on their electronic broadcast through the identity and management system. More specifically, the mobile device application is configured to utilize both the mobile device orientation and geographic location, along with the geographic location of the aircraft reporting its position within the identity and management system 200, to identify the aircraft that public user is querying. The position of the aircraft system and the position in which the aircraft system is located may be based at least in part on GPS trilateration.

Depicted in FIG. 8 is a process diagram of an illustrative embodiment of an aircraft identification query, according to embodiments of the present disclosure. Although a public user is described herein as the exemplary user of the system embodied by this process 800, it should be understood that any user, such as a government or law enforcement user, or any machine may implement the process 800.

The process 800 begins at step 802. At step 804, wherein the public user powers the passive interrogation device 290. As described herein, the passive interrogation device 290 may include a handheld computer device, tablet, mobile phone, or any other device such as an air traffic control workstation which is capable of interrogating an air traffic identity and management system, optionally without any active communication with the target aircraft 230. At step 806, the user observes the aircraft 230 which the user wishes to retrieve identifying information for. At step 808, the user points the interrogation device 290 toward the aircraft, and the interrogation device using sensors 291 and other possible inputs, including GNSS 102, determine the geographic position of the aircraft 230. At step 810, that information is sent to application 264 to query the aircraft identification data, along with a user credential. The application 264 receives the access request and credential at step 812. At step 814, the identity and management system 200 will correlate the estimated geographic location received from the interrogation device, which can be a combination of the geographic location and the orientation of the device along with estimated range, with the known aircraft data provided to flight activity event journal 274 of the system 200, for example, such as by processes 600 and/or 700. If no data is found from the correlation, at step 816, the system can provision a new flight event activity into the event journal 274. Otherwise, if data is found from the correlation, at step 818, the system will mediate the data access by way of the data access mediation application 265 utilizing the existing access policy in conjunction with the user credentials. Upon making a data access determination for the specific user, at step 820, the system will determine whether the aircraft information should be masked or substituted for any reason, such as if a covert law enforcement or military operation is in progress, and/or if the querying user is only authorized a generalized, substituted response that the flight activity is authorized or unauthorized. Once the system 200 determines which data to provide to the user, at step 822, the system responds to the user and provides the data to the device 290. At step 824, the user receives the data pertaining to the aircraft and, at step 826, the interrogation device can display or otherwise communicate the data to the user. The process then concludes at step 828.

The air traffic identity and management system of the present disclosure could be applied to several types of Internet of Things (IOT) or internet-connected devices which are in need of identifying the authenticated and verified user of the device. More specifically, the air traffic identity and management system can be used as a trusted broker to authenticate and verify the authenticity of users in any type of data sharing ecosystem. This can include user-directed and owned Internet of Things (IOT) devices, unmanned devices, or individuals interacting with financial data systems.

Today's identity-tracking systems are in need of security reform. Identity systems are commonly inefficient, corrupted, or stolen. The repeated defeat of identity will not stand as acceptable in the evolving cyber environment. The air traffic identity and management system described herein, as an advanced and secure permissioned blockchain, can work across the variety of social systems that require authenticated identity.

The user's identity is built by populating the identity and management system with information sourced from the connected services and natively entered and verified data from the user. The combination of this information, regularly updated via the APIs, make up the user's identity and management system.

Sharing of identity is done on a permission basis. The user may opt to share a portion of or the entirety of their identity information with certain types of users, components, and third parties in a UTM ecosystem and elsewhere through the Internet or other connected network. These third parties and other users could be customers of the user, regulators, the public, and other service providers. The underlying basis is that this is a permission based blockchain and that allows the user to share their information with a wide variety of stakeholders, but those stakeholders are only able to gain access to the information that they've been permitted to view and interact with. Access to identity information from these third parties is through identity and management system APIs.

There are at least two methods for tracking aircraft.

Telemetry data packets can be paired with the indentity blockchain information—enabling rapid up to date query and tracking of aircraft and devices connected to the identification and management system while also enabling the secure transmission of information contained in the blockchain.

Aircraft/device telemetry data can also be packaged directly into the identity and management system blockchain information. This is done so periodically throughout the operation of the aircraft, enabling the enhanced security and verification of tracking when paired with the more rapid telemetry data packets that are paired, but not directly included into the identity and management system blockchain.

The telemetry data packets notify location based services, including the identity and management system mobile application, that the system user aircraft/device is nearby or requesting access to the airspace or area administered by the location based service provider. While the location based service queries the identity and management system blockchain information to get access to the information that it needs to verify and authenticate the identity of the user and allow access to the aircraft/device.

Security.

As a permissioned based blockchain, the identity and management system is highly secure through the use of hash keys that link blocks together. In one embodiment, all blocks in the chain must authenticate to a previous block in the chain, establishing a secure provenance of information.

Connectivity.

The system's flexibility to build upon its blocks allows for API integration into the chain to build up on and contribute to the information that constitutes the identity of the user. This information, via the third parties, can be wide and vast, but the sealing of it in the blocks for permissioned viewing is highly desirable to the identity and management system and not previously known.

Interoperability.

The identity and management system is designed to be interoperable with a variety of existing and future systems and users—enabling the widespread dissemination and access to the blocks, based on stakeholder permission to view the information within the blocks. The identity and management system's flexibility is designed to allow access from nearly any internet connected device or service that has an approved API for connecting to and querying the identity and management system user identities.

Interaction with Evolving Technologies & Policies

The interoperability allows for it to not just be accessed, but also broadcast across physical and cyber mediums. The information keys can be accessed via broadcast radio, BLUETOOTH, or WIFI, and, pending the correct key is utilized, the third party user with the permission can gain access to the identity information that is broadcast through that transmission.

The identity and management system is designed to handle changes in the types of information that is required to be broadcast or shared from a policy standpoint. The flexibility of APIs to allow third party access assists with this from a technical perspective, but the identity and management system is setup to handle a wide variety of information so it is still functional in the event of policy alterations.

ID Through Permissioned Blockchain:

A blockchain based system can collect disparate information related to the user. The user authorizes the system to act as a trusted broker of their information to share with stakeholders who have permissions to access certain levels of personally identifiable information. The blockchain system according to this disclosure can connect to a variety of information and sources that range from associations, insurance policies, government databases and registries, private databases and registries, as well as the aircraft that the operator is flying.

The APIs that connect to the aircraft pull information from the aircraft into the system, linking it with the personal identifiable information. Such information could include the ground station, the aircraft, GPS location, make/model/firmware versions, and telemetry of the aircraft.

The identity, via the blockchain system, is queryable based on the location of the aircraft, or the IOT connected device. Queries may take place through integrations of internet connected devices or devices that have local network connectivity to the BLUETOOTH and WIFI channels that the aircraft or it's respective remote controller are broadcasting.

The above functionality is built through a series of APIs that can be plugged into third party applications, devices, and hardware that can produce similar to like functionality.

The identity of the aircraft and their users can also be used in conjunction with geofencing services to act as a "key" to gain access to those airspaces. Access to those airspaces is based upon the matching keys of the identity. The geofences and keys are dynamic and capable of altering permission for the IOT device to enter based upon the content of the identity that is represented in the blockchain system.

Blockchain is a transformation in the design of the ledger—it allows multiple parties to share information digitally in a distributed manner that is built upon the trust of previous records, or information blocks, in an efficient manner. It is most commonly understood as the technology that underpins crypto-currencies, but its ability to share information and establish trust is what makes it valuable and what makes it useful for the UAS industry and regulators as a registration and identity system.

A permissioned blockchain allows operators to register their information and allows regulators and operators to determine who can access and view ledger records. In an example flight with 26 record inputs the regulator may need to see information points A, B, and C of a flight's "information block" to identify and authorize the UAS operator, aircraft, and flight. At the same time the public may only be privy to information points A and E (if any) and the operator's client privy to information points C, F, G, and Z. Information points could range from name to location to certifications. In this way, the operator's identity is both shared and protected while simultaneously establishing a trust with the public, client, and regulator. Robust identification based on trust may be the future of UAS operations, but it need not be Orwellian. All users can expand into a new era of interconnectivity with this model. An operator's personal or confidential information isn't compromised and the public is delivered assurance and peace of mind that the aircraft that just flew overhead is authorized to be there and is not engaged in malicious behavior. This distributed permission of information builds trust with the public, ensures authority, and is critical in the forward progression of the industry.

The protection of the operator's information is vital. There are numerous examples of malicious and even violent behavior exhibited by individuals towards UAS operators. Exposing operator identifiable information is unacceptable, could jeopardize the operator or business, and does not follow suit with the practice of manned aircraft in US Class G airspace or even automobile registration and operation. The blockchain can however advise the public that the operation is authorized while granting the regulators the information they need for an operator to fly in a variety of airspaces or across boarders. We do not suggest that every flight need to submit identity to a regulator or public, but we know that it will be required in certain types of operations and airspaces for which the blockchain can be a solution.

Security is addressed through the blockchain's distribution and cryptographic processes for sealing records, preventing their tamper or alteration. No system will ever be perfectly secure, but the crypto-key and record dependent system in a blockchain is robust and helps to fulfill trust and verification through access of records. To break it would require enough computing power and expertise to alter the majority of the system—a difficult task considering the nature of the industry's size. Interfacing with other security protocols, such as SSL, is not impossible and further layers can be introduced should they become necessary. The security of blockchain systems is well recognized and has been implemented by the government of Estonia for many of their information networks as well as NATO, the U.S. Department of Defense, and the European Union.

The transformation of data in this system, like an ID, is instant and flexible. The ledger can be synchronized amongst regulators for ease of information transaction when transitioning airspaces or boarders. Regulators can immediately identify if the operator has the proper documentation they need to prove airworthiness or access to their airspace in a trusted system.

We envision regulators working on the same global blockchain so that all regulators can verify users amongst the industry, distributing identity verification around the globe, bridging trust gaps between states that benefit users, regulators, and operators.

Trust is the necessary factor to gain access to airspace and the blockchain can verify a complete record of flights, permissions, certificates, training, and other information that may be necessary to grant access to airspace.

A fascinating and powerful function of the blockchain is that it does not care if the operator is a human or a computer. It doesn't know the difference between a heart and a processor, but it can facilitate the registration, identification, and system interaction of both human, machine, and the people who may be responsible for the machines. This facilitation is critical for expansion of the industry as manual operations share the skies with automated operations.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

ELEMENT NUMBERING

The below list includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

100 Prior Art Aircraft Identity and Management System
102 GNSS System
104 Dedicated Radio Network
106 Wide Area Network
110 ATC
120 Manned Aircraft
122 Transponders
130 Unmanned Aircraft System (UAS)
132 UAS Aircraft
134 UAS Transceiver
140 Remote Controller
142 Remote Transceiver
144 UAS Operator
200 Inventive Air Traffic Identity and Management System
230 Aircraft System (Manned or Unmanned)
232 Aircraft Module
234 Aircraft Transceiver
236 Aircraft Memory
238 Aircraft Processor
240 Remote Controller
242 Controller Module
244 Controller Transceiver
246 Controller Memory
248 Controller Processor
250 Operator
260 System Processor
262 Application Layer
264 Application
265 Data Access Mediation Application
266 Authentication Application 267 Comm. w/Network
268 Other Apps (e.g., 3rd Party)
270 Data Store Layer
272 Operator Database
273 Devices/Aircraft Database
274 Events/Activity Database
275 Aeronautical Database
276 Policy Database
277 Local Regulation Database
280 Security Layer/Blockchain Layer
290 Interrogation Device
291 Device Sensor
292 Device Processor
296a-n Other Devices/Systems (ATC, ADS-B, Other Apps)
400 Secure Database Ecosystem
402 Secure Database
404 Stakeholder/User
406 Informational data pertaining to an owner of aircraft systems
408 Informational data pertaining to an operator of aircraft systems
410 Informational data pertaining to a manufacturer of aircraft systems
412 Informational data pertaining to affiliated services of aircraft systems
414 Public Stakeholders/User
416 Government/Law Enforcement Stakeholders/User
418 Other Stakeholders/User
420 Application Program Interface
422 ICAO Registry
424 Country Registry
426 Certificate Authority

What is claimed is:

1. A system for identifying an aircraft system, comprising:
a processor executing a data access mediation application,
the data access mediation application providing mediated access to selectively respond to queries for informational data relating to the aircraft system with a subset of the informational data based on a policy and based on an access credential presented,
the subset of the informational data pertaining to at least one of the aircraft system, an operator of the aircraft system, an owner of the aircraft system, and flight activity of the aircraft system, based at least in part on the mediated access to the informational data granted to the access credential under the policy; and
a passive interrogation device configured for:
storing the access credential;
specifying a position in which the aircraft system is located to query:
providing to the data access mediation application the access credential, the position, and a query for the informational data relating to the aircraft system; and
receiving from the access mediation application the subset of the informational data provided in response to the query and mediated access.

2. The system of claim 1, wherein: the passive interrogation device is further configured for receiving at least a portion of the informational data directly from a transmitter associated with the aircraft system.

3. The system of claim 1, wherein the passive interrogation device includes a handheld computer device.

4. The system of claim 1, further comprising an air traffic identity and management system, and wherein: the passive interrogation device is in communication with the air traffic identity and management system; and the subset of the informational data pertaining to flight activity of the aircraft system includes whether the flight activity is authorized or not.

5. The system of claim 1, wherein the flight activity of the aircraft system includes a location of a component of the aircraft system, and the location is based at least in part on GPS trilateration.

6. The system of claim 1, wherein the mediated access in providing the subset of the informational data includes masking and substituting select informational data.

7. The system of claim 6, wherein the substituted select informational data includes a status of the aircraft system from a group of statuses consisting of authorized, unauthorized, and unknown.

8. The system of claim 1, further comprising a secure database including: an aircraft registry storing informational data pertaining to the aircraft system; an owner registry storing informational data pertaining to at least one of an owner and an operator of the aircraft system; and an event journal storing informational data pertaining to at least one of a planned or executed flight activity of the aircraft system; and wherein the processor is in communication with the secure database and is in communication with the passive interrogation device via a wide area network, and at least a portion of the subset of the informational data is provided by the data access mediation application by communication with the secure database.

9. The system of claim 8, wherein the aircraft system includes an unmanned aircraft.

10. The system of claim 9, wherein:
the aircraft system further comprises a remote controller including a transceiver, the remote controller configured for operating the unmanned aircraft, and for receiving from the unmanned aircraft informational data pertinent to the event journal; and
the transceiver provisions the informational data pertinent to the event journal to the secure database via the wide area network.

11. The system of claim 10, wherein the data pertinent to the event journal includes a location of the remote controller.

12. The system of claim 8, wherein the aircraft system includes an aircraft and a transmitter associated with the aircraft, and the transmitter transmits the informational data pertinent to the event journal to the secure database.

13. The system of claim 12, wherein the passive interrogation device receives the informational data from the transmitter and the passive interrogation device sends the informational data to the data access mediation application to provision the secure database.

14. The system of claim 12, wherein the transceiver is capable of communicating with aviation specific radio transponders and ground stations.

15. The system of claim 8, wherein the secure database utilizes blockchain technology.

16. The system of claim 1, wherein the passive interrogation device includes the processor and the access mediation application.

17. The system of claim 1, wherein the processor and data access mediation application providing mediated access to selectively respond to queries for informational data occurs in real-time during flight activity of the aircraft system, and the passive interrogation device is further configured to transmit an interrogation request to a transceiver of the aircraft system and to receive informational data transmitted by the transceiver in response to the interrogation request.

18. The system of claim 2, further comprising a secure database including: an aircraft registry storing informational data pertaining to the aircraft system; and an owner registry storing informational data pertaining to an owner of the aircraft system; and wherein: the processor is geographically remote from the passive interrogation device and the processor is in communication with the secure database and is in communication with the passive interrogation device via a wide area network; at least a portion of the subset of the informational data is provided by the data access mediation application by communication with the secure database; and the passive interrogation device communicates to a user the portion of the subset of the informational data provided by the data access mediation application, and the portion of the informational data received from the transmitter associated with the aircraft system.

19. A system for identifying an aircraft system to a user, the system provided with access to a processor and a database, comprising:
   a passive interrogation device in communication with the processor and in direct wireless communication with a transmitter of the aircraft system; and
   an application executed by the passive interrogation device; and
   wherein: the processor executes a data access mediation application;
   the database is in communication with the processor and including:
   an aircraft registry storing informational data pertaining to the aircraft system; and
   an owner registry storing informational data pertaining to an owner of the aircraft system; and
   the application enables the passive interrogation device to:
   store an access credential;
   receive information from the transmitter of the aircraft system;
   provide to the data access mediation application the access credential, at least a subset of the information received from the transmitter of the aircraft system, and a query for the informational data relating to the aircraft system and based on the information received from the aircraft system;
   receive a subset of the informational data from the access mediation application in response to the access credential and the query; and
   communicating to the user the information received from the aircraft system and the subset of the informational data received from the access mediation application; and
   the data access mediation application is configured to provide the subset of the informational data pertaining to at least one of the aircraft system and an operator of the aircraft system, based at least in part on mediated access to the informational data granted to the access credential under a mediated access policy.

20. A system for identifying an aircraft system, comprising
   a processor in communication with a secure database a data access mediation application associated with the processor and the secure database, the database including an aircraft registry storing informational data; and
   a passive interrogation device in communication with the processor via a wide area network and in wireless communication with a transmitter of the aircraft system, the passive interrogation device providing:
   storage of an access credential;
   reception of information from the transmitter of the aircraft system;
   transmission of the access credential, at least a subset of the informational data received from the transmitter of the aircraft system, and a query for the informational data relating to the aircraft system to the processor and data access mediation application;
   reception of a subset of the informational data from the access mediation application in response to the access credential and the query; and
   communication to a user of the system information received from the aircraft system and the subset of the informational data received from the access mediation application; and
wherein the data access mediation application provides the subset of the informational data based at least in part on mediated access to the informational data granted to the access credential under a mediated access policy.

21. The system of claim 19, wherein the passive interrogation device further includes an air control workstation.

22. The system of claim 19, further comprising a plurality of passive interrogation devices.

* * * * *